July 24, 1923.
A. W. ROBINSON
1,462,830
FLOATING DISCHARGE PIPE FOR HYDRAULIC DREDGES
Filed Dec. 10, 1920　　3 Sheets-Sheet 1
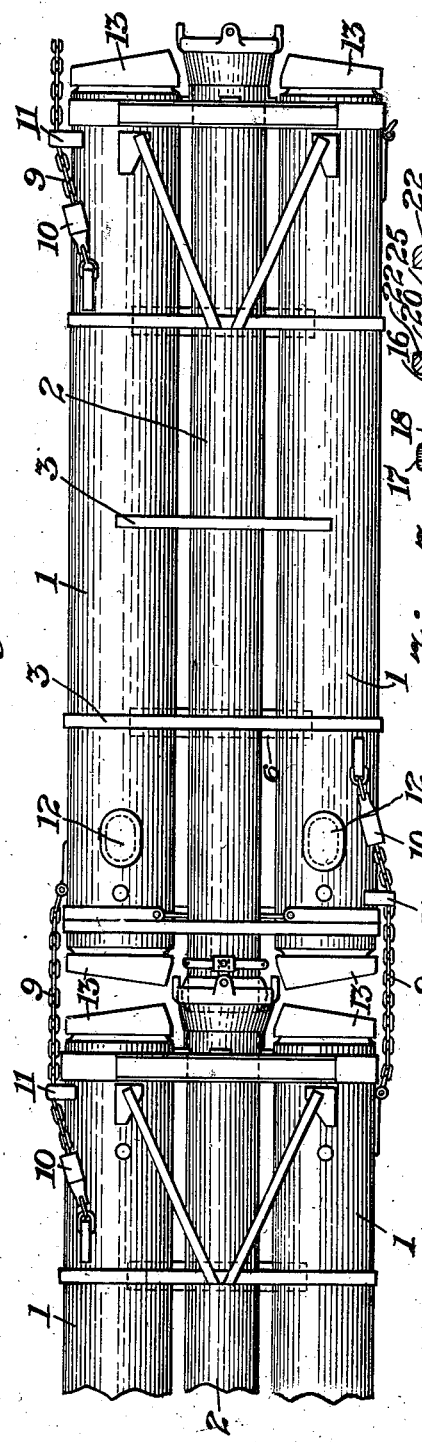
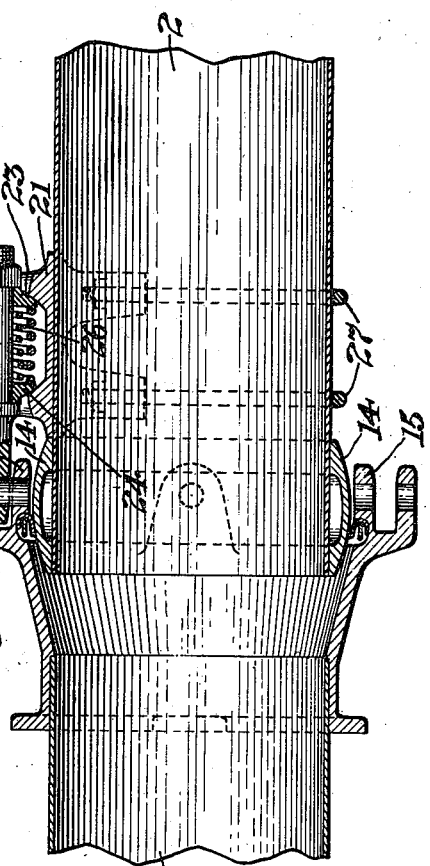
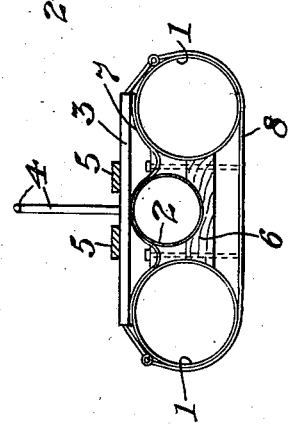
INVENTOR
Arthur W. Robinson
BY
Phillips Abbott
HIS ATTORNEY July 24, 1923.

A. W. ROBINSON 1,462,830

FLOATING DISCHARGE PIPE FOR HYDRAULIC DREDGES

Filed Dec. 10, 1920   3 Sheets-Sheet 2

INVENTOR
Arthur W. Robinson
BY Phillips Abbott
HIS ATTORNEY

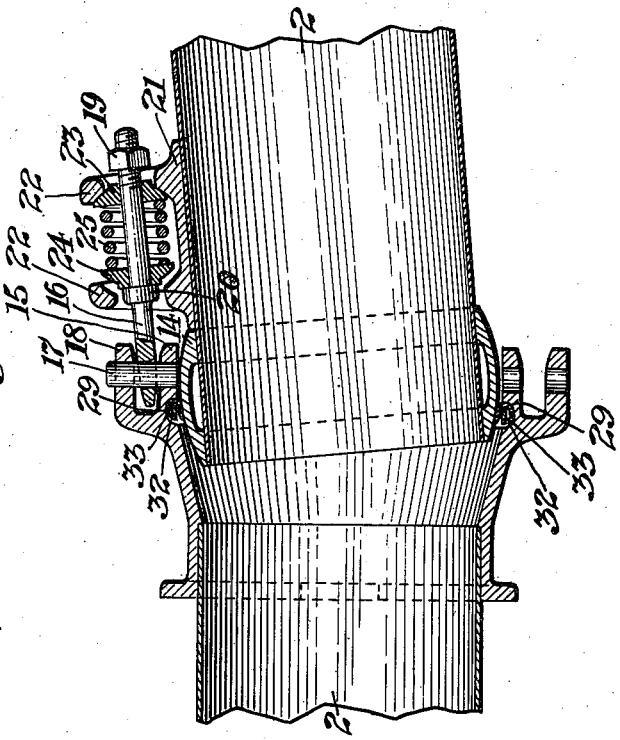
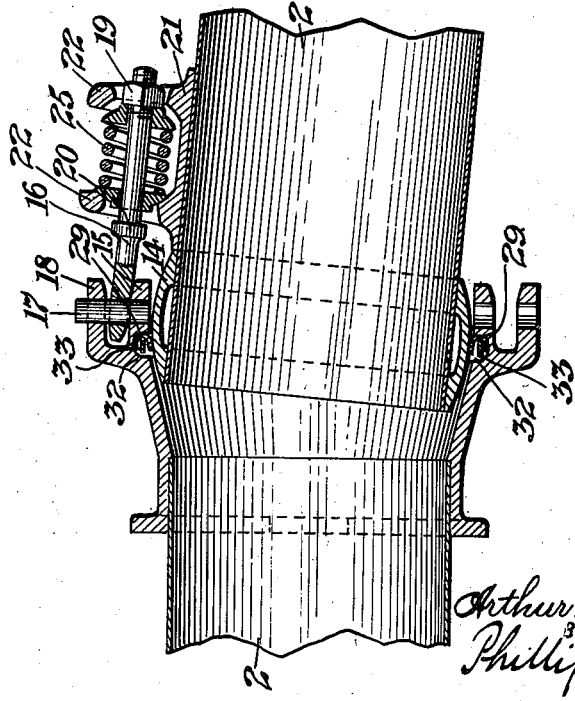

Patented July 24, 1923.

1,462,830

UNITED STATES PATENT OFFICE.

ARTHUR W. ROBINSON, OF MONTREAL, QUEBEC, CANADA.

FLOATING DISCHARGE PIPE FOR HYDRAULIC DREDGES.

Application filed December 10, 1920. Serial No. 429,654.

*To all whom it may concern:*

Be it known that I, ARTHUR W. ROBINSON, a citizen of the Dominion of Canada, and a resident of the city of Montreal, Province of Quebec, Dominion of Canada, have invented certain new and useful Improvements in Floating Discharge Pipes for Hydraulic Dredges, of which the following is a specification, reference being had to the accompanying drawings.

Formerly dredging apparatus of the class in which floating discharge pipes are used was ordinarily employed in relatively sheltered waters; but now and for some years past the conditions under which submarine dredging is done are such as to subject the apparatus to the destructive effects of storms, heavy currents and frequently considerable wave action, so that it has been found necessary, in order that the discharge pipe might withstand the destructive influences of the stated agencies, to make the parts larger, stronger and more seaworthy, and to correspondingly increase the strength of the discharge pipes themselves and to provide the ends of each float section with cushioning and strain resisting devices, that the integrity of the pipe line may be permanently maintained.

It is the purpose, therefore, of this invention to provide means whereby the cushioning springs, which relieve the strains upon the pipe, are adapted to resist or cushion against compressing as well as tensile or expanding strains, thus adapting the same device to dual operations. The invention also includes means whereby the discharge pipe of each float section may be rotated upon its longitudinal axis, so that the part which was formerly the bottom of the pipe and consequently subjected to the greatest wear due to the attrition of the spoils, may be turned upwardly and a different interior surface, not theretofore subjected to so great wear, be brought into position as the bottom of the pipe, thus greatly extending the period of service. The invention also relates to improvement of the packing for the ball and socket joint connecting the adjoining ends of the discharge pipe, so that it will be self-acting and will respond to the changed relation between the end of the pipe sections due to wave or current action.

Figure 4:
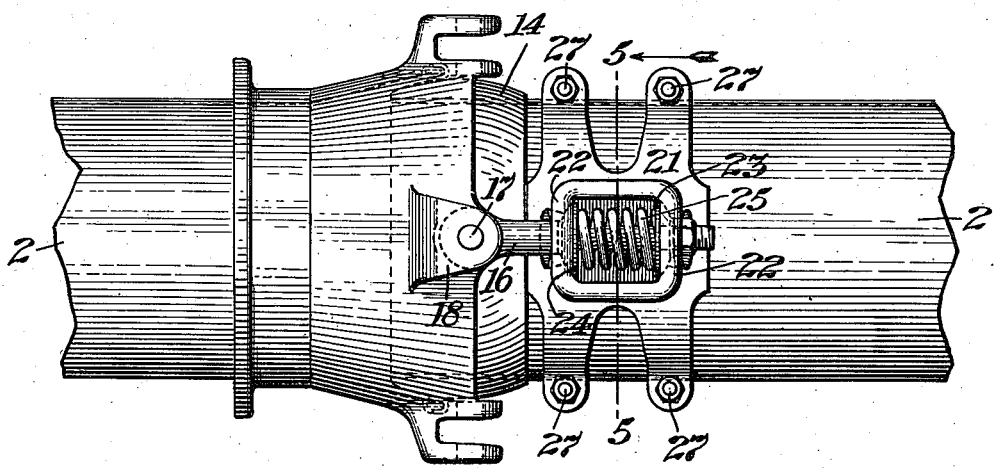
Figure 5:
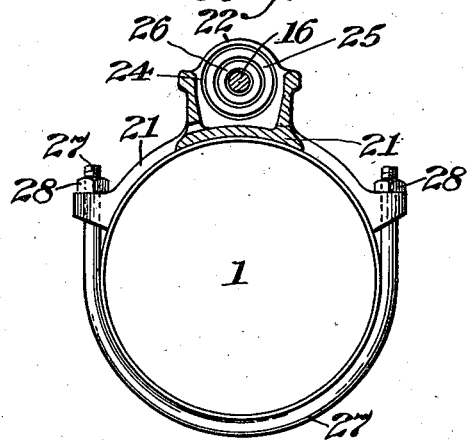
Figure 8:

Referring to the drawings, Fig. 1 is a plan view, showing one complete float or pipe section and also parts of an adjoining section, and the method of connecting the sections together; Fig. 2 is a transverse vertical sectional view through the center of a float, showing the relative arrangement of the parts; Fig. 3 is a side sectional view taken through the center of the adjoining ends of two floats; Fig. 4 is a plan view of that which is shown in Fig. 3; Fig. 5 is a vertical sectional view taken on the line 5—5 of Fig. 4 looking in the direction of the arrow; Fig. 6 is a vertical sectional view showing the position the parts assume when flexed as upon the crest of a wave, the connecting link being under tension and the cushioning spring under compression; Fig. 7 is a vertical sectional view showing the position the parts assume when flexed as in the trough of a wave, the connecting link and the cushioning spring being both under compression; Fig. 8 is a detail of the packing for the ball and socket joint.

Referring to Figs. 1 and 2, 1 represents the float, 2 the discharge pipe, 3 parts of the frame of the float, 4 the handrail, 5 the runways, 6 the timber spacers for the separation of the floats, which, as shown, are bolted to a corrugated metallic strap 7 (see Fig. 2), 8 (see Fig. 2) metallic straps which encircle the float structures at predetermined distances, whereby the parts are supported and maintained in relative position, 9 (see Fig. 1) chains, provided with cushioning devices 10 at their ends and preferably passing through fairleaders 11, 12, 12 manholes, provided with suitable sealing devices, whereby access to the interior of the floats may be had, 13, 13 the usual buffer blocks. The parts above described are well known and may be of any preferred construction.

Considering now the parts more particularly involved in this invention and having special reference to Fig. 3, 14 is the ball or spherical portion of the joint, and 15 the socket of the joint. The bore of the socket is parallel-sided, so that the ball may have suitable longitudinal movement through it, which is essential to compensate for the changed position of the two ends of the pipe under wave action. In order that the extent of such longitudinal movement may be controlled, I provide a link 16, which is secured by a pin 17, which passes through a portion of the socket and also through a lug 18 made integral with the socket. The hole in the end of the link through which the pin passes, is made somewhat conical at both sides, so that the pin fits somewhat loosely therein, and the link is adapted to have moderate vertical deflection from the horizontal. The pin has at its free end a heavy nut 19 and about midway its length a collar 20, and upon the end of the pipe, which carries the ball, I provide a casting 21, having upwardly extending parts 22, which serve as abutments for two spherical washers 23 and 24, and between the washers and encircling the shaft of the link, are springs 25 and 26, which are so arranged as to normally press the washers 23 and 24 apart and seat them respectively within spherical seats made in the opposed faces of the abutments 22. The casting 21 is held to the pipe upon which it is supported (see Figs. 4 and 5), by curved rods 27, which encircle the discharge pipe and pass through extensions from the casting 21, and are provided with nuts 28, so that these nuts being screwed up tight, the casting 21 and all its associated parts will be firmly held to the pipe, but when the nuts are run back and the rods 27 loosened, the pipe may be rotated upon its longitudinal axis, thus presenting a different interior lower surface to take the wear, whereupon the nuts will be again tightened.

In Figs. 6, 7 and 8 I illustrate my new packing for the ball and socket joint. The packing itself is illustrated in Fig. 8. It will be noted that it is of the cup type. It is preferably made of rubber or rubber in some combination with other suitable material; other suitable elastic or resilient material may be substituted therefor. It is of the general form shown at 29 in Fig. 8, in which preferably, but not necessarily, one member is made somewhat longer than the other and in its uncompressed condition has a considerable open or expanded form, but when put into the joint, as shown in Figs. 6 and 7, the longer member 30 will be compressed into substantially the position shown in Fig. 8 at 31 in dotted lines.

Referring to Figs. 6 and 7, it will be noted that the packing 29 is placed in an annular recess 32 made in the interior surface of the socket and it is there held in place by a confiner 33, which may beneficially be a resilient steel ring or band, which is split and sprung into place.

The operation of the several devices in their coactive or combined operation is as follows:

When the ends of two adjoining floats are upon the crest of a wave, then, as stated above, the position of the parts is as illustrated in Fig. 6, in which the relation of the two pipe sections is such that the lower half of the ball moves somewhat inwardly and the upper half moves somewhat outwardly, yet during these movements, owing to the elastic character of the packing, it maintains good hugging contact with the surface of the ball, and this is effected not only by its own resiliency, but also by the water pressure within the pipe which, passing through the opening between the ball and the socket, enters the concave or cup-shaped packing and additionally forces its inner member 30 into contact with the surface of the ball; and when the parts are in this position it will be noted that the free end of the link 29 has become depressed, occasioning compression of the cushioning spring or springs 25 and 26, so that the spherical washer 23 is caused to leave its seat, compressing the spring, the washer 24 acting as an abutment therefor; and when, on the other hand, the ends of two adjoining floats are in the trough of a wave, the parts assume the position shown in Fig. 7, in which it will be noted that the ball has moved through the socket in the opposite direction, that the packing has likewise shifted its position, but still maintains contact with the surface of the ball, and that the spherical washer 23 has been seated against its support 22 and the opposite washer 24 has been forced off its seat, compressing the spring or springs as before, yet from the reverse direction. I call particular attention to the fact that the washers, owing to their partially spherical exterior surfaces, which engage in similarly shaped or concave seats in the abutments 22 respectively, not only receive reliable support, but that the tendency is to center them relative to each other and to maintain the link in such position as to avoid bending strains coming upon it.

It will be further noted that there are a plurality (four are shown in the drawings) of lugs 18 produced upon the socket, so that the pipe to which the socket is attached may be given a series of turns upon its longitudinal axis without the necessity of unriveting or unbolting the socket from the pipe, thus presenting different portions of its interior as the bottom of the pipe, and correspondingly prolonging its life, and also providing at the top of the pipe in each position the necessary lug for the pin connection with the link. The casting 21 (one only of which is employed), which supports the spring or springs and the washers which act as abutments therefor, is not riveted to the opposite end of the pipe, on the contrary, is held by the rods or straps 27, see Fig. 5, and the nuts 28, so that when rotation of the pipe is desired, these nuts being loosened, the pipe can be rotated on its longitudinal axis without changing the position of the casting and the spring cushioning devices supported by it.

It will be noted that in Fig. 3 of the drawings I show two cushioning springs, a larger one 25 exteriorly and a smaller one 26 interiorly, both encircling the stem of the link, and in the other figures of the drawings I show a single heavy spring only. These are alternative and equivalent constructions, each being preferable under special conditions, but whether there be one or more springs is immaterial.

It will also be noted that although I prefer, for considerations of economy, to have one spring device only on the appropriate end of each pipe section, yet obviously a series of spring castings may be permanently attached to the end of the pipe, just as there are a plurality of lugs 18 on the opposite end of the pipe.

It will be obvious to those who are familiar with such matters that many changes may be made in the details of construction of the parts above described and illustrated without departing from the essentials of the invention. I therefore do not limit myself to such details.

I claim:

1. In a floating discharge pipe for dredges a ball and socket joint in the discharge pipe in combination with a link pivotally connected to one of the pipe sections, a spring cushioning device on the adjoining pipe section, the link engaging with the spring, and spherical washers having spherical seats, which act respectively as abutments for the spring against pressures in either direction and as centering devices for the spring and the link.

2. In a floating discharge pipe for dredges a pipe section provided with a socket having a plurality of lugs attached at one end and a single casting on the other end, a spring cushioning device supported by the casting, means to detachably attach the casting to the pipe, and a link for the spring cushioning device, adapted to interchangeably engage said lugs.

In testimony whereof I have signed my name to this specification.

ARTHUR W. ROBINSON.